UNITED STATES PATENT OFFICE.

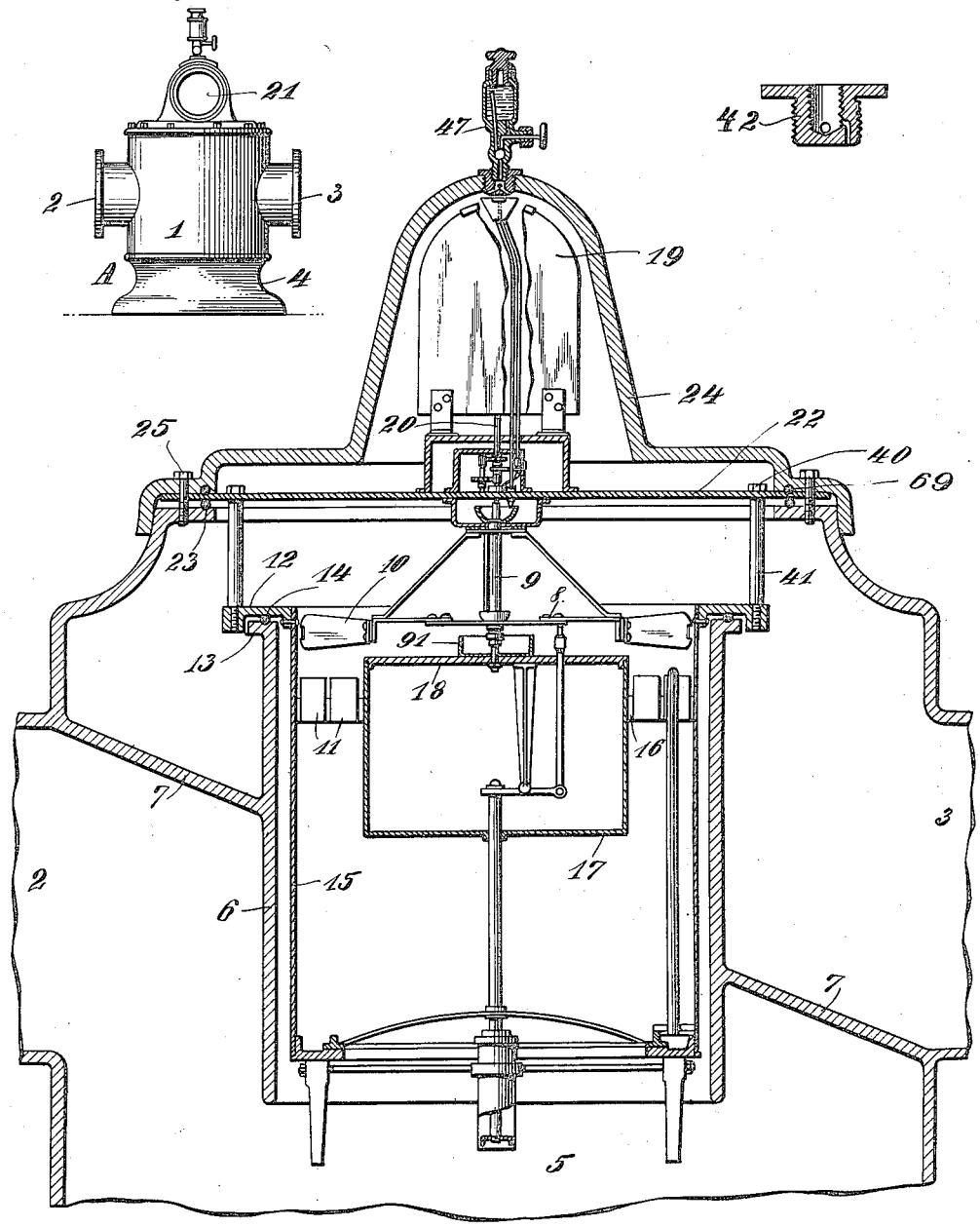

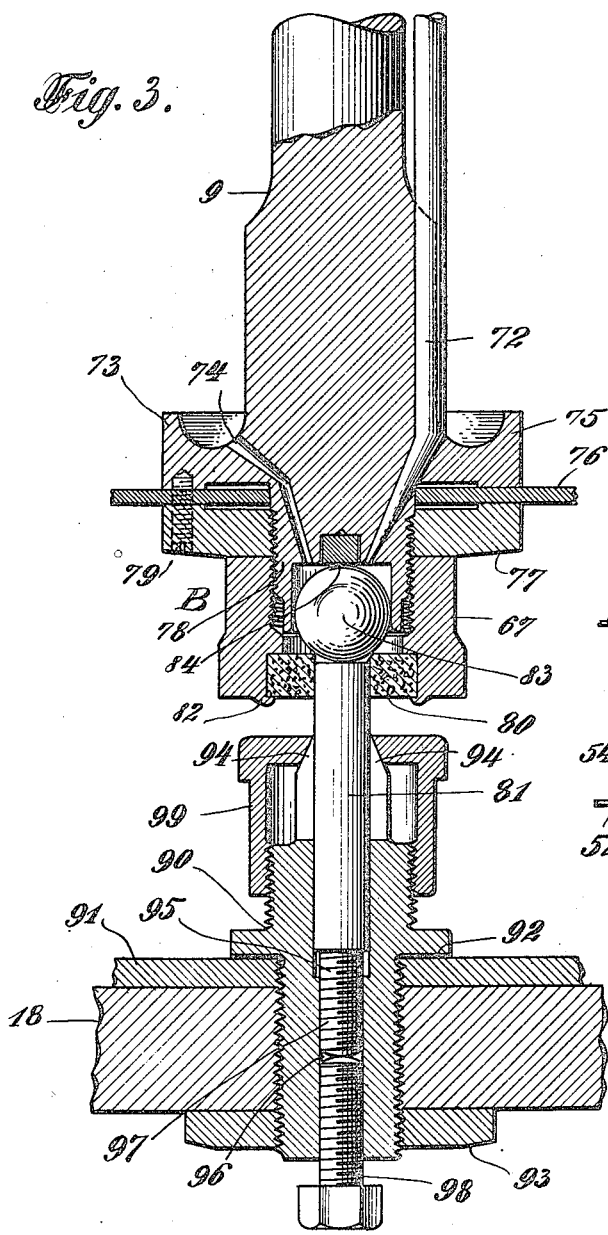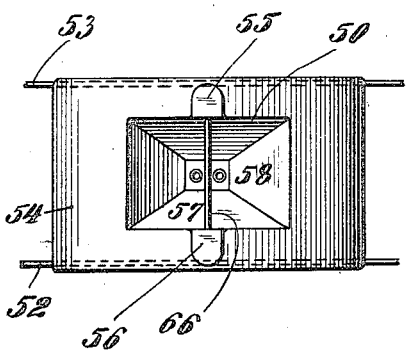

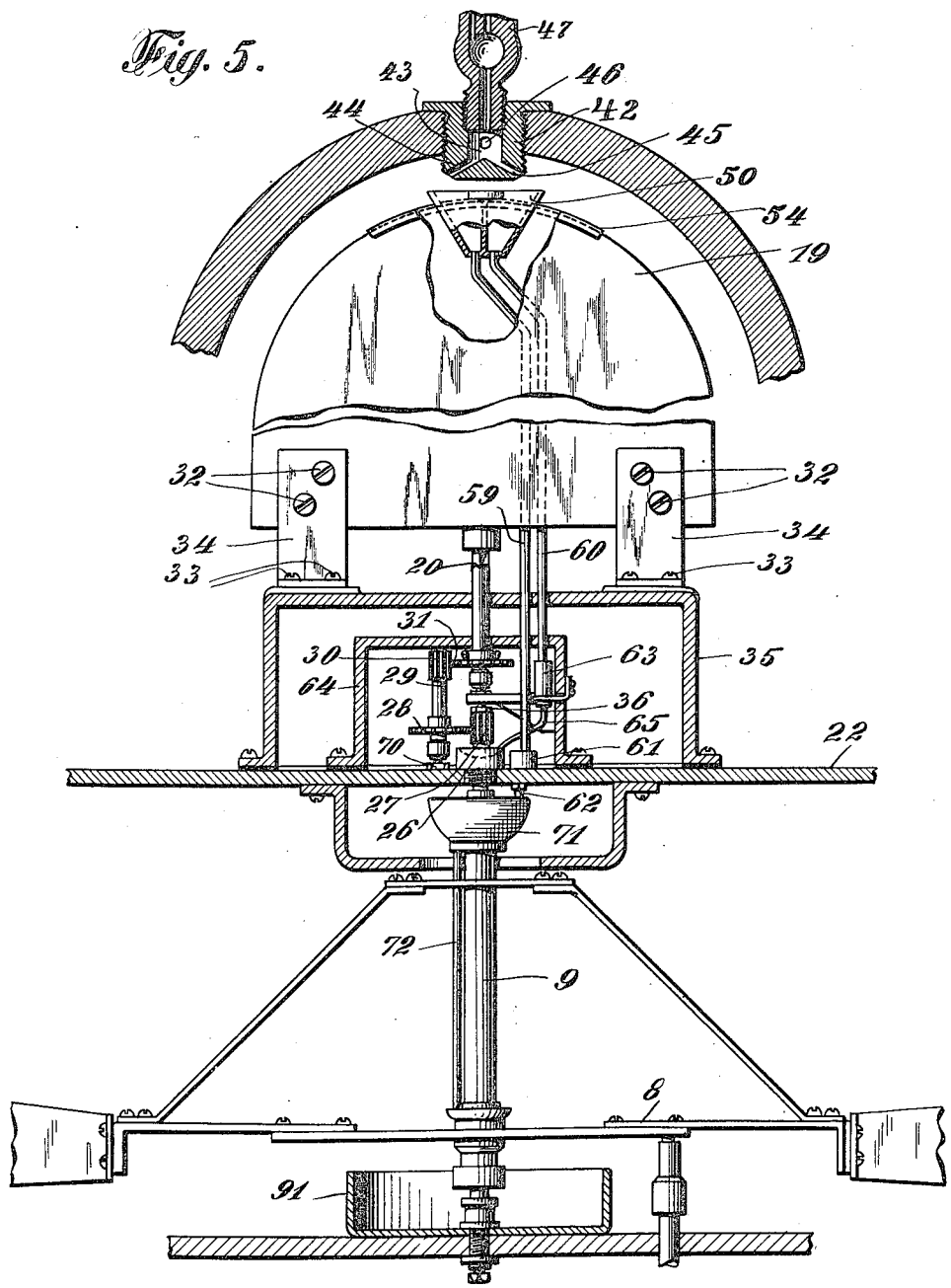

CHARLES P. MAYER, OF ELIZABETH, NEW JERSEY, ASSIGNOR TO ROTARY METER COMPANY, A CORPORATION OF NEW YORK.

ROTARY-METER BEARING.

1,305,824.           Specification of Letters Patent.      Patented June 3, 1919.

Original application filed September 10, 1915, Serial No. 49,916. Divided and this application filed January 19, 1918. Serial No. 212,587.

*To all whom it may concern:*

Be it known that I, CHARLES P. MAYER, a citizen of the United States, and a resident of Elizabeth, Union county, and State of New Jersey, have invented certain new and useful Improvements in Rotary-Meter Bearings, set forth in the following specification.

This invention relates to rotary meters adapted to measure the flow of gaseous fluids through the means of a vane rotated by the flowing fluid. The object of the invention is to render the rotating parts as freely rotatable as possible. To this end there are embodied in the invention novel bearings and lubricating means.

The above will be better understood by reference to the accompanying specification, which describes an illustrative embodiment of the invention in connection with the showing thereof, in the accompanying drawings which form a part hereof, in which like characters designate corresponding parts in the several figures, and in which Figure 1 is a vertical section with parts broken away showing the interior mechanism in combination with various means entering into the invention; Fig. 2 is a vertical elevation showing the exterior construction of a rotary meter of the type contemplated; Fig. 3 is an enlarged view, for the most part in vertical section and partly in vertical elevation showing the main bearing and adjustable main bearing stud; Fig. 4 is a plan view drawn to an enlarged scale of the interior oir reservoir; Fig. 5 is a detail view drawn to an enlarged scale showing the oiling system and various parts in vertical section and vertical elevation; and Fig. 6 is a detail view in vertical section at right angles to the section of Fig. 1, of the entrance nipple for the oil.

A indicates a rotary meter of the type contemplated which comprises a main casting 1 with its entrance duct 2 and its exit duct 3 and supported by a suitable base 4 forming a closure for the interior 5 of the casting 1. Within the meter casting a vertically arranged cylindrical wall 6 is supported by a diagonal cross partition 7 so that gaseous fluid entering the duct 2 is forced to pass through the interior of the cylindrical shell 6 before it can make an exit through the exit duct 3. The propulsion means for the meter is a vane-wheel 8 carried on the vertical axle 9 and provided with vanes 10 arranged vertically over a ring of ports 11, which ports 11 provide the only means of passage for gaseous fluid from the duct 2 to the duct 3, the interior of the cylindrical shell 6 being closed by the flanged ring 12, seated upon the flange 13 of shell 6 and sealed by the gasket 14. The ring 12 sustains the port shell 15 to which is adapted a port ring 16, while the interior cylindrical box 17 is secured to and supported by the port ring 16. 18 is a supporting casting of the spindle 9.

The purpose of the vaned wheel 8 is to drive a registering mechanism 19, the operating shaft for which is indicated by 20. The dial wheels for the mechanism 19 are visible through the window 21 in the finished structure, although the dials are not shown, as the same form no part of the present invention.

Spaced a suitable distance above the vanes 10 is a top plate 22 sealed to the main casting by the gasket 23 and clamped in place by the top housing 24 through the medium of the cap screws 25. The vane-spindle 9 is extended upwardly through the plate 22 in which it is journaled in the bearing 26 and is fitted at its top with a pinion 27 meshing with the gear 28 carried by spindle 29 which in turn carries pinion 30 meshing with gear 31 on the drive shaft 20 of the registering mechanism. This drive shaft 20 is releasably clutched to the registering mechanism 19 as through the medium of a squared end so that the registering mechanism 19 may be bodily removed by unfastening mounting screws 32 or 33, serving to mount the legs 34 respectively upon the registering mechanism 19 and the box casting 35.

By removing the screw 36, the pinion 27 may be removed from the upper end of the spindle 9 to permit the removal of the top plate 22 from the vane wheel proper provided merely that the cap screws 40 are unscrewed from the studs 41. In like manner then the vane wheel 8 may be removed bodily from its mounting. This provision for the removal individually of the various sets of mechanical means in the meter is important to facilitate adjustment and repair. To provide lubricating means which will adapt itself to this removal of individual sets of parts and at the same time effect the lubrication of all the parts when they are completely assembled is one of the decided advantages of the invention.

The top hood casting is centrally bored and tapped at the top to receive a nipple 42 which has a central oil chamber 43 straddling exit ducts 44 and 45 and a pressure equalizing duct 46. This nipple 42 is exteriorly threaded and interiorly threaded to take an oil cup 47 of any suitable construction such as that illustrated. Beneath the mouths of the straddling drip ducts 44 and 45 is arranged an oil reservoir 50 shown in detail in Fig. 5 and may be suitably supported upon the front and back plates 52 and 53 of the registering mechanism 19 through the medium of a curved bridging plate 54 centrally perforated to receive the reservoir which is actually held up by its ears 55 and 56. The reservoir 50 is divided by the partition 66 into two compartments 57 and 58. Oil ducts 59 and 60 respectively lead downwardly from the compartments 57 and 58. The duct 59 terminates just inside of an oil pocket 61 supported on the plate 22 which has an exit nipple 62 extending through the bottom of the plate 22. The duct 60 terminates just inside of an oil pocket 63 mounted by a suitable bracket on the yoke casting 64. This oil duct 63 has an inturned exit nipple 65 discharging into the cup-shaped top of the journal 26. By terminating the ducts 59 and 60 in oil pockets the entire registering mechanism together with the ducts 59 and 60 may be made to be removed and replaced without interfering with the remainder of the oiling system. The casting 35 has a vertical continuous wall and has a gasket at its bottom where it is secured to the plate 22 so that any overflow of oil from the journal 26 will first fill up the bottom of the compartment within casting 35 to lubricate the bearing 70 and will then overflow into the oil pocket 61 and thence downward through nipple 62. Formed on the upper end of the spindle 9 but beneath the plate 22 is an annular oil cup 71 catching the drip from nipple 62. Extending downwardly from the interior of cup 71 is a duct 72 which in turn discharges directly into the interior of the main bearing B for the spindle 9. In addition the lower end of the spindle 9 is formed with an oil catching flange 73, likewise connected by an oil duct 74 with the interior of the bearing B. Through the medium of the nipple 62 and cup 71 it is clear that the plate 22 may be removed and replaced without interfering with the oiling system.

The main spindle bearing B comprises an abutment flange 75 against which the ring 76 of the vane wheel 8 is clamped by the threaded nut 77, which threads upon the counter bored threaded end 78 of the spindle 9. A positive locking of these parts may be accomplished by the screw 79. The lower end of the nipple 67 is open and counter bored to form a setting for the journaling jewel 80 which forms a journal for the supporting stud 81 and may be held in place by lips 82. The weight of the spindle and the parts sustained thereby is supported by the stud 81, but between it and the spindle 9 are interposed a steel ball 83 or any ball suited for any special fluid and an anti-friction anvil 84, the ball 83 and contacting parts being well lubricated by the ducts 72 and 74.

The stud 81 is mounted so that a nicety of vertical adjustment, together with positive lateral stability may be secured. A nipple 90 is threaded into the casting plate 18 and also serves the purpose to position the oil drip reservoir 91, which is oil tight through the gasket 92. A lock nut 93 locks the nipple 90 in place. The top end of the nipple 90 is formed into a plurality, preferably four, of conical ring-fingers 94 formed by cross cutting the top end of the nipple 90. The upper portion of this nipple 90 is bored to provide a vertical socket 95 fitting the stud 81. The lower portion is provided with an opening 96 which is threaded to take the threaded lower end 97 of the stud 81 and the locking screw 98. A jam cap 99 is threaded over the top end of the nipple 90. When the jam cap 99 is loose and the locking screw 98 is loose a vertical adjustment of the stud 81 may be accomplished readily by rotating the stud 81. When its proper vertical adjustment is accomplished it may be locked in place by tightening the screw 98. Tightening the cap 99 jams the conical ring fingers 94 in against the stud 81 positively supporting it against any lateral movement This application is a division of my copending application for a lubricating system for rotary meters, Serial No. 49,916, filed Sept. 10, 1915, allowed Dec. 15, 1917.

What I claim and what I desire to secure by United States Letters Patent is:—

1. In a machine, a spindle having a pocket as a fixed part at its lower end and inclosing and holding assembled as a part of the spindle structure an axially centered ball; a pivot for engaging said ball; and an oil duct leading from near the top of said spindle into said pocket.

2. In a machine, a spindle arranged in a substantially vertical position and having a pocket at its lower end and having a lateral bearing at its extreme lower edge; a bearing ball held loosely in said pocket; a pivot engaging said ball within said pocket and said lateral bearing; and means on said spindle whereby oil may be conveyed downwardly along said spindle and into said pocket.

3. In a machine, a spindle arranged in a substantially vertical position and having a bearing pocket at its lower end; a pivot engaging within said pocket; a bearing at the upper end of said spindle; means for supplying a lubricant to said last mentioned bearing; and means on said spindle for conveying surplus lubricant from said last mentioned bearing downwardly along the spindle, to the first bearing.

4. In a machine, a spindle arranged in a substantially vertical position and having a bearing pocket at its lower end; a pivot engaging within said pocket; an annular oil catching flange formed upon said spindle above said pocket to receive oil therein; and the spindle having a passage-way formed therethrough from said oil catching flange into said pocket.

5. In a machine, a spindle having an annular flange formed thereon; and having a threaded axial extension beyond said flange; a turbine wheel having a portion telescoping over said extension and resting against said flange; a clamp member threaded upon said extension to retain the wheel against the flange, the extension having a pocket formed in the end thereof; an axially centered ball within said pocket; a pivot engaging said ball; and a member also threaded upon said extension having parts to retain said ball and to center said pivot.

6. In a machine, a spindle having a pocket at the lower end thereof; a ball within said pocket; a pivot support engaging said ball; and a member connected with the spindle having a part to center the pivot with respect to the ball.

7. In a machine, a spindle having a pivot bearing at its lower end having a downwardly facing flat bearing surface, a pivot engaging said bearing with an upwardly facing bearing surface; and anti-friction means included in the bearing comprising a single freely rotatable approximately axially centered ball engaging said flat-bearing surface.

8. In a machine, a shaft having an axially positioned pocket at one end; a jewel axially mounted in said pocket and having an outwardly directed flat bearing face; a bearing member having an axially positioned cylindrical bearing wall and partially closing said pocket; a bearing ball loosely retained in said pocket; and a pivot rod having lateral engagement against said cylindrical bearing and thrust engagement against said ball.

9. In a machine, a shaft having an axially positioned pocket at one end; a jewel axially mounted in said pocket and having an outwardly directed flat bearing face; a screw cap for said pocket mounting a perforated jewel having an axially positioned cylindrical bearing wall and partially closing said pocket; a bearing ball loosely retained in said pocket; and a pivot rod having lateral engagement against said cylindrical bearing and thrust engagement against said ball.

10. In a machine, a spindle having a pivot bearing at its lower end; a pivot rod extending upwardly in axial alinement with said spindle and having its upper end engaging said bearing; supporting connections for the rod at its lower end; and clamp means adjustable for clamping the rod at a point spaced above its lower end to retain the rod against lateral movement.

11. In a machine, a spindle having a pivot bearing at its lower end; a pivot rod extending upwardly in axial alinement with said spindle and having its upper end engaging said bearing; a support at the lower end of the pivot rod having a threaded opening therethrough in axial alinement with the pivot rod into the upper portion of which the lower end of the pivot rod is threaded for vertical adjustment of said rod; and a screw threaded upwardly into the lower porition of said opening adapted to engage the lower end of said rod to lock said rod in any position of vertical adjustment.

12. In a machine, a spindle having a pivot bearing at its lower end; a pivot rod extending upwardly in axial alinement with said spindle and having its upper end engaging said bearing; a support at the lower end of the pivot rod having a threaded opening therethrough in axial alinement with the pivot rod into the upper portion of which the lower end of the pivot rod is threaded for vertical adjustment of said rod; a screw threaded upwardly into the lower portion of said opening adapted to engage the lower end of said rod to lock said rod in any position of vertical adjustment; said support having a tapering split sleeve portion extending upwardly and surrounding the rod at a point spaced above the lower end of the rod; and a collar engaging said split sleeve portion and having threaded engagement with the support adapted to clamp the parts of the sleeve against the rod to reinforce the rod against lateral movement.

In testimony whereof I have signed my name to this specification, this fifth day of January, 1918.

CHARLES P. MAYER.